United States Patent [19]

Miyake et al.

[11] 4,150,975
[45] Apr. 24, 1979

[54] PROCESS FOR PRODUCING METALLIC CHROMIUM

[75] Inventors: Hiroshi Miyake; Satoru Tenma; Nobuyoshi Sato; Akira Honda, all of Yamagata, Japan

[73] Assignee: Toyo Soda Manufacturing Co., Ltd., Yamaguchi, Japan

[21] Appl. No.: 922,590

[22] Filed: Jul. 6, 1978

[30] Foreign Application Priority Data

Jul. 12, 1977 [JP] Japan ................................ 52-82566

[51] Int. Cl.$^2$ ............................................. C22B 34/32
[52] U.S. Cl. ................................... 75/101 R; 75/11; 75/27; 75/114; 75/101 BE; 75/84; 75/121
[58] Field of Search ............. 75/27; 11; 114; 101 BE; 101 R; 121; 84; 423/54

[56] References Cited

U.S. PATENT DOCUMENTS

| 49,682 | 8/1865 | Margulies | 75/121 X |
|---|---|---|---|
| 1,826,261 | 10/1931 | Simpson | 75/121 |
| 2,381,236 | 8/1945 | Udy | 75/121 X |
| 3,301,669 | 1/1967 | Rathmann et al. | 75/11 X |
| 3,658,507 | 4/1972 | Gohin et al. | 75/27 X |
| 3,861,903 | 1/1975 | Coyle et al. | 423/53 X |
| 3,875,285 | 4/1975 | Nymann et al. | 423/54 |

Primary Examiner—G. Ozaki
Attorney, Agent, or Firm—Cushman, Darby & Cushman

[57] ABSTRACT

Disclosed is a process for producing metallic chromium from a chromium- and iron-containing ore. First, the chromium- and iron-containing ore is subjected to carbon reduction to obtain a ferro-chrome; secondly, the ferro-chrome is treated with a chlorinating agent, such as aqueous hydrochloric acid, to obtain an aqueous solution containing chromium chloride and ferrous chloride; thirdly, the ferrous ion present in the aqueous chlorinated solution is oxidized into a ferric ion; fourthly, the aqueous ferric ion-containing solution is contacted with an extractant to extract the ferric ion therefrom; fifthly, the extraction residue, i.e. an aqueous chromium chloride solution, or powdered chromium chloride obtained therefrom, is treated in an oxidizing atmosphere maintained at 500°–1,400° C. by an oxidizing flame where the chromium chloride is roasted to be thereby converted to chromic oxide, and; finally, the chromic oxide is reduced into metallic chromium, preferably by a carbon reduction procedure carried out in two stages.

8 Claims, No Drawings

PROCESS FOR PRODUCING METALLIC CHROMIUM

This invention relates to a process for producing metallic chromium from a chromium ore.

Metallic chromium is widely used as an alloying addition to be incorporated in, for example, nickel, cobalt and iron, because the incorporation of chromium imparts to these metals good wear resistance, thermal resistance and strength.

Processes of producing metallic chromium are classified into two main categories, i.e. a dry refining process and a wet refining process. A typical dry refining process comprises the steps of: roasting a mixture of a finely divided chromium ore with soda ash in air to obtain a clinker; leaching the clinker with water to obtain an aqueous solution containing sodium chromate; forming chromium oxide from the aqueous sodium chromate solution via chromic anhydride by repeated refining such as crystallization, and; then, reducing the chromium oxide into metallic chromium by a Thermit process using powdered aluminum. This dry refining process has the following problems. That is, first, the chromium compounds dealt with in this process are mainly composed of hexavalent chromium, which is noxious to health. Therefore, special care and equipment are required for protection of the environment from a mist generated upon the alkaline roasting, a residue left after the leaching with water and a mist generated upon the roasting of chromic anhydride. Secondly, a large amount of sodium sulfate is inevitably produced in the step of refining chromic acid. Thirdly, the repeated crystallization is not advantageous from a standpoint of energy and material conservation.

A typical wet refining process comprises the steps of: reducing a chromium ore in the presence of carbon into a high carbon ferro-chrome; dissolving the high carbon ferro-chrome in sulfuric acid, and; then, subjecting the solution to electrolytic reduction to deposit metallic chromium. This wet process also has some problems. That is, the electrolytic reduction and the refining of the chromium solution is not advantageous from the point of view of energy cost, as well as in the complicated equipment, which is required for separating iron as iron alum from the chromium solution prior to the electrolytic reduction, recovering as chromic acid chromium left unelectrolyzed in the electrolyzed solution, and further, for cycling the electrolyzed sulfuric acid containing solution for re-use. Furthermore, the waste disposal requires extensive cost and labor for the satisfactory protection of the environment.

A main object of the present invention is to provide a process for producing metallic chromium from a chromium ore which has none of the defects of the above-mentioned conventional chromium refining processes, i.e. which is advantageous particularly from the point of view of cost and energy conservation.

Other objects and advantages of the present invention will be apparent from the following description.

In accordance with the present invention, there is provided a process for producing metallic chromium which comprises the steps of: (1) reducing a chromium and iron-containing ore in the presence of a carbonaceous material to obtain ferro-chrome; (2) treating the ferro-chrome with a chlorinating agent to obtain an aqueous solution containing chromium chloride and ferrous chloride; (3) oxidizing the ferrous iron present in the aqueous solution containing chromium chloride and ferrous chloride into a ferric ion; (4) contacting the ferric ion-containing solution with an extractant to extract the ferric ion from the solution; (5) treating the chromium chloride of the aqueous solution, from which the feric ion has been extracted, in an oxidizing atmosphere maintained at a temperature of from 500° to 1,400° C. by an oxidizing flame where the chromium chloride is roasted, to be thereby oxidized it into chromium oxide, and; then (6) reducing the chromium oxide into metallic chromium.

A typical example of the chromium and iron-containing ore used as the starting raw material is chromite. The reduction of the chromium and iron-containing ore into ferro-chrome is effected by heating the ore in the presence of a carbonaceous material in a furnace. The carbonaceous material used includes, for example, coke, carbon black and graphite. Preferably, the reduction of the chromium and iron-containing ore is effected by heating the ore together with coke and fluorite in an electric furnace maintained at a temperature of from 1,500° C. to 1,700° C.

The obtained ferro-chrome is treated with a chlorinating agent to obtain an aqueous solution containing chromium chloride and ferrous chloride. A suitable chlorinating agent is aqueous hydrochloric acid having at least one normal concentration, more preferably 6 to 12 normal concentrations. Preferably, the ferro-chrome may be, after being pulverized into a finely divided powder or particles, incorporated in aqueous hydrochloric acid and maintained at a temperature of from 60° to 120° C. Alternatively, the ferro-chrome may be, after being pulverized into coarse particles, packed in a column through which aqueous hydrochloric acid maintained at a similar temperature is passed, if desired, repeatedly. Another suitable chlorinating agent is gaseous chlorine. That is, the ferro-chrome may be, after being pulverized into particles or powders, contacted with gaseous chlorine at an elevated temperature, and then, the chlorinated product may be dissolved in water.

The aqueous chloride solution in aqueous hydrochloric acid usually contains b 50 to 200 g/l of chromium, 10 to 100 g/l of iron and 0.2 to 12N of free hydrochloric acid. More preferably, the solution contains 100 to 150 g/l of chromium, 10 to 50 g/l of iron and 0.6 to 2N of free hydrochloric acid.

The chromium and iron-containing solution is then treated with an oxidizing agent, which is capable of oxidizing the ferrous ion present therein to the ferric ion. Such treatment with the oxidizing agent may be carried out by introducing a chlorine gas into the chromium and iron-containing solution or adding a suitable oxidizing agent, such as chromic anhydride, to the chromium and iron-containing solution. The amount of the oxidizing agent may be that theoretically required for the oxidation reaciton.

For the separation of iron from chromium present in the oxidized solution, the solution is brought into contact with an extractant to extract the ferric ion from the solution. Suitable extractants include, for example, organic phosphates and other organic phosphorus-containing compounds, such as trioctyl phosphate, tributyl phosphate, di-2-ethylhexyl phosphate and tributyl phosphine oxide, and; primary, secondary, tertiary amines and quaternary ammonium salts, such as trialkylmethylamine, N-dodecyltrialkylmethylamine, triisooctylamine, tri-n-octylamine, tricaprylamine, tricaprylmethylammonium chloride and methylbenzylamine. These extractants are preferably used as solutions diluted with a diluent. Suitable diluents include, for example, aliphatic hydrocarbons and their chlorides such as kerosine, n-hexane, trichloroethylene and carbon tetrachloride, and aromatic hydrocarbons such as xylene, toluene and benzene. The concentration of the extractant in the diluted solution is usually within the range of from 5 to 50% by weight, more preferably from 10 to 30% by weight.

It is advantageous that the extraction of the ferric ion be effected at a temperature of 0° to 80° C., more preferably 10° to 40° C., and by using a countercurrent type extraction column.

The extractant, which has been used for the extraction of the ferric ion, is then contacted with water, whereby the ferric ion contained in the extractant solution is transferred as ferric chloride into the aqueous phase. The extractant solution, from which the ferric ion has been removed by the extraction with water, may be re-used for the extraction of the ferric ion from the oxidized solution containing chromium and iron. The amount of water used for the extraction of the ferric ion is preferably such that the resultant water contains the extracted ferric ion in a concentration of 10 to 100 g/l. The ferric chloride recovered from the aqueous ferric chloride solution can be used as, for example, a cleaning agent, an etching agent and a raw material for red oxide, ferrite and powdered iron.

The chlorinated and oxidized solution, from which the ferric ion has been removed by extraction, contains a salient amount of chromium and sometimes minor amounts of other impurity metal ingredients, such as copper, manganese, cobalt, zinc, lead, bismuth, indium and molybdenum. The content of the impurity metal ingredients varies depending upon the particular high carbon ferro-chrome used. If metallic chromium of a high purity is intended to be produced by the process of the present invention, it is preferable that the solution containing chromium and other impurity metal ingredients be brought into contact with an extracting medium in order to extract the impurity metal ingredients from the solution. Such extraction may be carried out in a manner approximately similar to that employed for the extraction of the ferric ion from the chlorinated and oxidized solution. However, it is advantageous to use as the extractant tertiary amines such as triisooctylamine, tri-n-octylamine and tricaprylamine.

The chromium chloride of the solution or slurry, from which the ferric ion and optionally the above-mentioned impurity metal ingredients have been extracted, i.e., an aqueous chromium chloride solution or slurry, is then roasted to be thereby oxidized into chromium oxide. The roasting of the chromium chloride of the solution, from which the ferric ion has been removed, may be carried out by treating the chromium chloride of the aqueous solution or slurry in an oxidizing atmosphere maintained at a temperature of from 500° to 1,400° C. by an oxidizing flame. By the term "oxidizing flame" is meant a flame which is formed, for example, by burning hydrogen in the presence of a larger amount of oxygen than that theoretically required for the combustion of hydrogen or by burning such fuels as city gas, methane, propane, butane, kerosence, heavy oil and carbon monoxide. Such roasting of the chromium chloride may be carried out by spraying or directly atomizing the aqueous chromium chloride solution or slurry into the oxidizing flame; or by first drying the aqueous chromium chloride solution or slurry to obtain powdered chromium chloride, and then, spraying the powdered chromium chloride into the oxidizing flame. Alternatively, the roasting of the chromium chloride may be made by a conventional fluidized bed roasting procedure. The roasting temperature is preferably in the range of from 800° to 1,000° C.

When the chromium chloride is roasted, gaseous hydrogen chloride is inevitably evolved. Therefore, it is advantageous to recover the hydrogen chloride by using, for example, a scrubber, and further, to prepare aqueous hydrochloric acid of the desired concentration and cyclically use the aqeuous hydrochloric acid in the step of dissolving a ferro-chrome therein.

the roasted product, which is chromic oxide ($Cr_2O_3$), is pulverized into powders or particles. Then, the chromic oxide powders or particles are, together with suitable amounts of a carbonaceous material and a binder, compression-molded into a briquette of a suitable shape. The carbonaceous material used includes, for example, carbon black and graphite. The binder used includes, for example, synthetic resins, such as a phenol-formaldehyde resin, a resorcinol-formaldehyde resin, polyurethane and an epoxy resin; synthetic organic polymeric materials, such as polyvinyl acetate, polyvinyl alcohol, polyvinyl butyral and polyacrylates, and; natural organic high molecular compounds, such as starch, dextrin, gum arabic and casein. The molding pressure may be in the range of from 0.1 to 5 ton/cm$^2$, preferably from 1 to 3 ton/cm$^2$. Such a briquette is convenient for use in the succeeding reduction step. When the binder is used in an aqueous solution form, the briquette should be dried so that a major part, preferably at least 95% by weight, of the water contained therein is removed prior to the reduction of the chromic oxide.

The dried briquette is then heated to reduce the chromic oxide into metallic chromium. It is advantageous that the reduction of the chromic oxide be effected in two stages, i.e. primary and secondary reduction stages, as explained hereinafter, in order to produce metallic chromium of a high purity with an enhanced efficiency.

That is, in the primary reduction stage, the briquette is maintained at a temperature of from 1,100° to 1,400° C., preferably from 1,200° to 1,300° C., under an atmospheric or sub-atmospheric pressure. The primary reduction should preferably be carried out to an extent such that the resulting reduced product contains 1 to 10% by weight, more preferably 1 to 6% by weight, of oxygen and 1 to 10% by weight, more preferably 1 to 5% by weight, of carbon. The extent of the reduction may be varied mainly depending upon the particular period of reaction time. A suitable reaction period is usually within the range of from 3 to 12 hours, although it varies depending upon the reaction temperature and pressure. A reaction period exceeding 12 hours is not preferable from standpoints of energy conservation and the extent of reduction obtained.

The reaction pressure in the primary reduction is usually within the range of from 0.1 to 760 torrs, preferably 1 to 10 torrs. An excessively reduced pressure, i.e. a pressure of lower than 0.1 torr, is not preferable because a salient amount of chromium is lost due to evaporation during the reduction procedure.

The reduced product obtained by the above-mentioned primary reduction procedure is pulverized into particles of less than 100 meshes in size. The particles are, together with suitable amounts of a carbonaceous material, if desired, and a binder, compression-molded into a briquette. The briquette is dried and, then, subjected to the secondary reduction. The carbonaceous material and binder used may be selected from those which are mentioned above, with respect to the preparation of the briquette used in the primary reduction. When the amount of carbon contained in the primary reduction product is less than the stoichiometric amount corresponding to the amount of oxygen contained in the primary reduction product, a suitable amount of the carbonaceous material should preferably be added in the preparation of the briquette used in the secondary reduction, so that the total amounts of the carbon is substantially stoichiometric. In contrast, when the amount of carbon is more than the stoichiometric amount corresponding to the amount of oxygen, a suitable amount of high purity chromic oxide should preferably be added.

The secondary reduction is usually carried out at a temperature of from 1,300° to 1,500° C., preferably from 1,350° to 1,450° C., and a pressure of from 0.1 to 760 torrs, preferably from 1 to 10 torrs, for a period of from 6 to 24 hours, preferably from 12 to 16 hours.

Instead of the above-mentioned carbon reduction procedure, other conventional reduction procedures may be employed. For example, the chromic oxide may be subjected to a Thermit process carried out in the presence of a metallic reducing agent, such as metallic aluminum or metallic silicon, and a slag material, such as quick lime. Or, the primary reduction product obtained by the above-mentioned primary reduction procedure may be heated in a hydrogen atmosphere to obtain the intended metallic chromium.

The metallic chromium obtained by the process of the present invention is of high purity and contains only negligible amounts of iron and other impurity metals, and gaseous ingredients, such as carbon, nitrogen, oxygen and hydrogen.

The invention will be further illustrated by the following examples, wherein percents are by weight unless otherwise specified.

EXAMPLE 1

4.2 ton of a chromium ore having the composition shown in Table I, below, were placed together with 924 kg of coke and 392 kg of silica in an electric furnace, wherein the chromium ore was heated to a temperature of approximately 1,600° C. so that it was molten. The high carbon ferro-chrome so obtained, with a yield of 2.43 ton, had the composition shown in Table I, below.

Table I

| | Composition of chromium ore and high carbon ferro-chrome (%) | | | | |
|---|---|---|---|---|---|
| Chromium ore | $Cr_2O_3$ | $SiO_2$ | FeO | MgO | $Al_2O_3$ |
| | 54.6 | 4.6 | 12.6 | 15.3 | 8.6 |
| High carbon ferro-chrome | Cr | Fe | C | Si | |
| | 72.59 | 19.22 | 6.41 | 0.69 | |

The high carbon ferro-chrome in a block form was crushed into pieces 20 to 100 mm in size, and then packed in a column-type continuous dissolving vessel. An aqueous 25% hydrochloric acid solution was continuously introduced into the vessel from the lower part thereof at a flow rate of 700 ml/min, and an aqueous solution of the high carbon ferro-chrome was also continuously withdrawn therefrom at a flow rate of 680 ml/min, while the exhausted high carbon ferro-chrome was supplemented into the vessel. The dissolution temperature was 105° C. and the residence time of the solution in the vessel was three hours. The aqueous solution was filtered, and then, flowed down through a column packed with Rasching rings at room temperature while a chlorine gas was countercurrently flowed up therethrough. As a result, the ferrous ion present in the filtered solution was oxidized into the ferric ion. The content of the residual ferrous ion in the so treated aqueous solution was less than 0.001 g/l. Then, the aqueous solution was countercurrently contacted with air, by using a similar Rasching ring-packed column, thereby to remove excessive chlorine from the solution.

Then, the aqueous solution was countercurrently contacted with an extracting medium, i.e. a 20% solution of n-dodecenyltrialkylamine (trade name, Amberlite LA-1) in xylene, at a temperature of 20° C., by using a mixer-settler type three stage extractor. As a result, the ferric ion was transferred from the aqueous phase to the organic phase. The solvent ratio of the organic phase to the aqueous phase was 4.

The ferric ion-containing solution was countercurrently contacted with water at a solvent ratio of 4 and a temperature of 30° C., in a manner similar to that used in the above-mentioned extraction of the ferric ion, by using a mixer-settler type four stage extractor. Thus, the ferric ion was back-extracted from the organic phase to the aqueous phase.

The residual aqueous solution, which was left upon the above-mentioned extraction of the ferric ion by using the n-dodecenyltrialkylamine solution, was countercurrently contacted with a 20% solution of tri-n-octylamine in xylene, at a solvent ratio of 1 and a temperature of 20° C., by using a mixer-settler type two stage extractor. As a result, metal impurities other than iron, such as manganese, cobalt, copper, lead and zinc, were extracted. The solution containing these metal impurities was countercurrently contacted with water, at a solvent ratio of 2 and at a temperature of 30° C., in a manner similar to that used in the above-mentioned extraction of the metal impurities, by using a mixer-settler type single stage extractor. Thus, the metal ingredients were back-extracted.

The respective compositions of (A) the high carbon ferro-chrome solution in aqueous hydrochloric acid, (B) the aqueous solution containing the back-extracted ferric ion, (C) the residual aqueous solution which was left upon the extraction of the ferric ion and (D) the residual aqueous solution which was left upon the extraction of the metal impurities, i.e. an aqueous chromium chloride solution, were as shown in Table II, below.

Table II

| Solution | Ingredient (g/l) | | | | | | | | |
|---|---|---|---|---|---|---|---|---|---|
| | Cr | Fe | Mn | Co | Cu | Zn | Pb | Si | H+ |
| A | 112 | 58.2 | 0.45 | 0.10 | 0.14 | 0.02 | 0.02 | <0.01 | 1.5 |
| B | 0.09 | 58.2 | <0.001 | <0.001 | 0.008 | <0.001 | <0.001 | <0.01 | 0.2 |
| C | 112 | <0.001 | 0.45 | 0.10 | 0.14 | 0.02 | 0.02 | <0.01 | 1.3 |

Table II-continued

| Solution | Ingredient (g/l) | | | | | | | | |
|---|---|---|---|---|---|---|---|---|---|
| | Cr | Fe | Mn | Co | Cu | Zn | Pb | Si | H+ |
| D | 112 | <0.001 | <0.001 | <0.001 | <0.001 | <0.001 | <0.001 | <0.01 | 1.1 |

The aqueous chromium chloride solution was introduced into a fluidized bed type roasting oven at a flow rate of 25 l/hour, where the chromium chloride was roasted at a temperature of 900° C. in an oxidizing flame, formed by introducing propane and air into the oven at flow rates of 4.63 $Nm^3/$ and 20 $m^3$/min, respectively, thereby to produce chromic oxide in a continuous manner. 18% of hydrochloric acid was recovered from the combustion exhaust gas by using a scrubber. The obtained chromic oxide had the composition shown in Table III, below.

Table III

| Composition of chromic oxide (%) | | | | | | | |
|---|---|---|---|---|---|---|---|
| $Cr_2O_3$ | Fe | S | Pb | Cu | Al | Si | Cl |
| 99.5 | 0.012 | 0.005 | 0.0001 | 0.0001 | 0.004 | 0.0016 | 0.01 |

1,000 g of the chromic oxide were well mixed with 238 g of a finely divided carbon powder. The mixture was kneaded together with 200 ml of an aqueous polyvinyl alcohol solution of a 60 g/l concentration, and then, compression molded into briquettes at a pressure of 200 kg/cm². The briquettes were dried at a temperature of 110° C. for 12 hours, and then, maintained at a temperature of 1,300° C. and a pressure of 1 torr for a period of 6 hours in a vacuum furnace. The so reduced product (referred to as "primary reduced product") was pulverized, by using an oscillating mill, into particles of 100 mesh or less. The primary reduced product particles were mixed with 0.12 g of a finely divided carbon powder. The mixture was kneaded together with 30 ml of an aqueous polyvinyl alcohol solution of a 200 g/l concentration, and then, compression molded into briquettes at a pressure of 2 ton/cm². The briquettes were dried at a temperature of 110° C. for 12 hours, and then, maintained at a temperature of 1,400° C. and a pressure of 1 torr for a period of 16 hours in a vacuum furnace, thereby to obtain a finally reduced product (referred to as "secondary reduced product").

The primary and secondary reduced products contained, in addition to chromium, the ingredients shown in Table IV, below.

Table IV

| Reduced product | Compositions of primary and secondary reduced products | | | | | | | |
|---|---|---|---|---|---|---|---|---|
| | Ingredient (%) | | | | | | | |
| | Fe | S | Pb | Cu | Si | N | C | O | H |
| Primary | 0.009 | 0.008 | 0.0001 | 0.0001 | 0.010 | 0.008 | 3.10 | 3.89 | 0.07 |
| Secondary | 0.010 | 0.005 | 0.0001 | 0.001 | 0.010 | 0.008 | 0.01 | 0.03 | 0.0005 |

EXAMPLE 2

30.53 kg of chromic oxide similar to that obtained in Example 1 were mixed with 10.21 kg of a finely divided aluminum powder and 2.04 kg of finely divided calcium oxide particles of a below 1 mm particle size by using a pot mixer. The mixture was pre-heated for 4 hours in a furnace maintained at a temperature of 550° C. The pre-heated mixture was placed in a cylindrical furnace stamped with a finely divided magnesia powder, where the mixture was ignited by using as an ignitor a small amount of a finely divided metallic magnesium powder and barium peroxide. Such Thermit reduction produced 17.20 kg of metallic chromium. The resultant metallic chromium contained, in addition to chromium, the ingredients shown in Table V, below.

Table V

| Composition of Thermit reduction product (%) | | | | | |
|---|---|---|---|---|---|
| Fe | S | Al | Si | C | P |
| 0.12 | 0.011 | 0.12 | 0.06 | 0.02 | 0.005 |

What we claim is:

1. A process for producing metallic chromium which comprises the steps of:
   reducing a chromium- and iron-containing ore in the presence of a carbonaceous material to obtain a ferro-chrome;
   treating the ferro-chrome with a chlorinating agent to obtain an aqueous solution containing chromium chloride and ferrous chloride;
   oxidizing the ferrous ion present in the aqueous solution containing chromium chloride and ferrous chloride, into the ferric ion;
   contacting the aqueous ferric ion-containing solution with an extractant to extract the ferric ion therefrom;
   treating the chromium chloride of the aqueous solution, from which the ferric ion has been extracted, in an oxidizing atmosphere maintained at a temperature of from 500° to 1,400° C. by an oxidizing flame where the chromium chloride is roasted to be thereby converted to chromium oxide, and; then,
   reducing the chromium oxide into metallic chromium.

2. A process according to claim 1 wherein the reduction of the chromium oxide into metallic chromium is effected by the steps of:
   reducing the chromium oxide in the presence of a carbonaceous material to an extent such that the reduced product contains 1 to 10% by weight of oxygen and 1 to 10% by weight of carbon, based on the weight of the reduced product, and; then,
   further reducing said reduced product at a pressure of 0.1 to 760 torrs into metallic chromium.

3. A process according to claim 2 wherein said first reduction step is carried out to an extent such that the reduced product contains 1 to 6% by weight of oxygen and 1 to 5% by weight of carbon, based on the weight of the reduced product.

4. A process according to claim 1 wherein the reduction of the chromium oxide into metallic chromium is effected by a Thermit process.

5. A process according to claim 1 wherein the aqueous solution of the chlorinating agent is aqueous hydrochloric acid having at least one N concentration and the amount thereof is such that the resultant aqueous solution contains 50 to 200 g/l of chromium, 10 to 100 g/l of iron and 0.2N to 12N of free hydrochloric acid.

6. A process according to claim 1 wherein said oxidation of the ferrous ion to the ferric ion is carried out by introducing into the ferrous ion-containing aqueous solution at least one substance selected from the group consisting of gaseous chlorine and chromic anhydride.

7. A process according to claim 1 wherein said extractant used for the extraction of the ferric ion is a solution of 5 to 50% by weight of an extracting agent in diluent; said extracting agent being at least one compound selected from the group consisting of organic phosphates and other phosphorus-containing compounds, primary, secondary and tertiary amines and quaternary ammonium salts, and said diluent being at least one compound selected from the group consisting of hydrocarbons and chlorinated hydrocarbons.

8. A process according to claim 1 wherein the aqueous solution, which has been contacted with the extractant to extract the ferric ion therefrom, is further contacted with a tertiary amine extractant to extract impurity metal ingredients other than iron, prior to the step of roasting the chromium chloride of the aqueous solution.

* * * * *